United States Patent
Ooshima et al.

(10) Patent No.: US 8,026,011 B2
(45) Date of Patent: Sep. 27, 2011

(54) FUEL CELL ASSEMBLY

(75) Inventors: Yoshihide Ooshima, Kagoshima (JP);
Kazuto Matsukami, Kagoshima (JP);
Takashi Shigehisa, Kagoshima (JP);
Akira Kokaji, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 1416 days.

(21) Appl. No.: 11/042,957

(22) Filed: Jan. 25, 2005

(65) Prior Publication Data

US 2005/0164067 A1 Jul. 28, 2005

(30) Foreign Application Priority Data

Jan. 28, 2004 (JP) ................................. 2004-020279
Nov. 26, 2004 (JP) ................................. 2004-342337

(51) Int. Cl.
*H01M 2/08* (2006.01)
(52) U.S. Cl. ........................................ 429/433; 429/510
(58) Field of Classification Search .................... 429/19, 429/20, 26, 34, 38, 39, 32, 433, 463, 510
See application file for complete search history.

(56) References Cited

U.S. PATENT DOCUMENTS

| | | | |
|---|---|---|---|
| 5,338,623 A | 8/1994 | Nachlas et al. | |
| 6,165,632 A | 12/2000 | Blum et al. | |
| 6,402,156 B1 | 6/2002 | Schutz et al. | |
| 6,492,050 B1 | 12/2002 | Sammes | |
| 7,214,441 B2 * | 5/2007 | Cortright et al. ................. | 429/35 |
| 7,399,720 B1 * | 7/2008 | Brow et al. ....................... | 501/17 |
| 2004/0191593 A1 * | 9/2004 | Ono et al. ......................... | 429/19 |
| 2006/0063659 A1 * | 3/2006 | Xue et al. ......................... | 501/15 |

FOREIGN PATENT DOCUMENTS

| | | |
|---|---|---|
| EP | 0562724 A2 | 2/1993 |
| JP | 05029010 A | 2/1993 |
| JP | 09283170 A | 10/1997 |
| JP | 10-092450 | 4/1998 |
| JP | 10-321244 | 12/1998 |
| JP | 9917390 A | 4/1999 |
| JP | 2000328279 A | 11/2000 |
| JP | 2001518688 A | 10/2001 |
| JP | 2003-282107 | 10/2003 |
| JP | 2003-282132 | 10/2003 |
| JP | 20003-282107 | * 10/2003 |

(Continued)

OTHER PUBLICATIONS

Japanese language office dated Mar. 9, 2010 and its English language translation for corresponding Japanese application 2004020279 lists the references above.

Japanese language office action dated Mar. 9, 2010 and its English language translation for corresponding Japanese application 2004342337 lists the references above.

(Continued)

*Primary Examiner* — Jennifer K Michener
*Assistant Examiner* — Monique Wills
(74) *Attorney, Agent, or Firm* — DLA Piper LLP (US)

(57) ABSTRACT

A fuel cell assembly in which ends on one side of the cells forming gas passages are gas-tightly fixed to a holding means. Between the peripheries of the ends on one side of the cells and the holding means, there are arranged a fixing member for fixing the cells to the holding means and a sealing member for accomplishing a gas-tight sealing between the ends on one side of the cells and the holding means. The fixing member has a softening temperature of not lower than 1000° C. and the sealing member has a softening temperature of from 700 to 1000° C.

14 Claims, 5 Drawing Sheets

FOREIGN PATENT DOCUMENTS

| | | | |
|---|---|---|---|
| JP | 2003282129 | A | 10/2003 |
| JP | 2003282132 | A | 10/2003 |
| JP | 2004063355 | A | 2/2004 |
| WO | 0131078 | A2 | 5/2001 |

OTHER PUBLICATIONS

European Search Report for corresponding European application 05001709.4-1227 lists the references above, Nov. 21, 2007.

* cited by examiner

FUEL CELL ASSEMBLY

FIELD OF THE INVENTION

The present invention relates to a fuel cell assembly of the type in which ends on one side of the cells forming gas passages are gas-tightly fixed to a holding means.

DESCRIPTION OF THE RELATED ART

In recent years, there have been proposed fuel cell systems of a variety of types such as those of polymer electrolyte type, phosphoric acid type, molten carbonate type and solid oxide type, as the next generation energy sources. The solid oxide type fuel cell systems, in particular, operate at a high temperature of around 700 to 1,000° C., but have advantages such as a high electrical efficiency and availability of waste heat. Thus, their research and development are under way.

In a typical example of the solid electrolyte type fuel cell system as taught in JP-A-2003-282107 and JP-A-2003-282132, cells comprising a plate-like support substrate that slenderly extend are arranged in a predetermined direction, and ends on one side of the cells, i.e., the lower ends thereof are fixed to an upper surface of a gas casing via a suitable holding means. Gas passages are formed in the respective support substrates that penetrate through and extend in the lengthwise direction thereof, and are communicated with the interior of the gas casing, permitting a fuel gas (or an oxygen-containing gas) fed into the gas casing to flow into the individual gas passages of the support substrates from the gas casing. It is important that the ends on one side of the cells are gas-tightly fixed to the holding means to prevent the leakage of the fuel gas (or oxygen-containing gas) in the gas casing from the peripheries of the holding means and support substrates to which the ends on one side of the cells are fixed. JP-A-10-92450 discloses a fixing structure for gas-tightly fixing the ends on one side of the cells to the holding means and a crystallized glass, which remains in the state of a solid phase at operation temperatures and is used as a fixing and sealing member suited for the gas-tight fixing. Further, JP-A-10-321244 discloses a structure for gas-tightly fixing the ends on one side of the cells to the holding means and a composite body comprising chiefly a crystallized glass, which remains in the state of a solid phase at operation temperatures and ceramics and is used as a fixing and sealing member suited for the gas-tight fixing.

Here, it is important that the ends on one side of the cells are sufficiently firmly fixed while maintaining sufficiently reliable gas tightness even at operation temperatures of from about 700 to about 1000° C. In the conventional fuel cell assemblies, however, the fixing structure must be very complex for maintaining firm fixing and reliable gas tightness and consequently, it often happens that either the firm fixing or the reliable gas tightness might be impaired. If described in further detail, when there is used a fixing and sealing member that is in a solid phase at an operation temperature, i.e., which has a softening temperature higher than the operation temperature, cracks occur in the fixing and sealing member when it is cooled in the step of production, thereby causing impairment of gas tightness. On the other hand, when there is used a fixing and sealing member having a low softening temperature, the fixing and sealing member is softened during the operation and the cells are not firmly fixed.

SUMMARY OF THE INVENTION

It is therefore a principal object of the present invention to provide a novel and improved fuel cell assembly which does not have to employ a complex fixing structure and which enables the ends on one side of the cells to be fixed to the holding means sufficiently reliably gas-tightly and sufficiently firmly.

Through keen study and experiment, the present inventors have discovered the fact that a single material has been so far arranged between the ends on one side of the cells and the holding member for accomplishing the fixing and sealing, but when there are arranged, between the ends on one side of the cells and the holding means, a fixing member that is for fixing the cells to the holding means and a sealing member that is for accomplishing a gas-tightly sealing between the cells and the holding means, the fixing member and the sealing member having properties different from each other, the above principal object can be achieved.

That is, according to the present invention, to achieve the above-mentioned principal object of the present invention, there is provided a fuel cell assembly in which ends on one side of the cells forming gas passages are gas-tightly fixed to a holding means, wherein:

between the peripheries of the ends on one side of the cells and the holding means, there are arranged a fixing member for fixing the cells to the holding means and a sealing member for accomplishing a gas-tight sealing between the ends on one side of the cells and the holding means, the fixing member and the sealing member having properties different from each other.

According to a preferred embodiment, portions higher than the ends on one side of the cells are exposed in an electricity generation chamber, and the sealing member is arranged on the side of the electricity generation chamber in regard to the fixing member, so that the fixing member is covered with the sealing member so as to be avoided from being exposed to the electricity generation chamber. Preferably, the fixing member has a softening temperature of not lower than 1000° C. and the sealing member has a softening temperature of from 700 to 1000° C. The fixing member is a ceramic, a glass or a cement and, particularly, a crystalline ceramic having a high degree of crystallinity and containing $SiO_2$, $ZnO$, $B_2O_3$ and RO (R is an alkali earth metal). It is desired that the sealing member is a glass or a crystalline or amorphous ceramic having a low degree of crystallinity and containing $SiO_2$, $ZnO$, $B_2O_3$ and RO (R is an alkali earth metal). It is desired that a coefficient of thermal expansion $\alpha 1$ of the cells is smaller than a coefficient of thermal expansion $\alpha 2$ of the holding member, and a coefficient of thermal expansion $\alpha 3$ of the fixing member is not smaller than 50% of the coefficient of thermal expansion $\alpha 1$ of the cells but is not larger than 150% of the coefficient of thermal expansion $\alpha 2$ of the holding means ($0.5\, \alpha 1 < \alpha 3 < 1.5\, \alpha 2$). It is desired that a coefficient of thermal expansion $\alpha 4$ of the sealing member is not smaller than the coefficient of thermal expansion $\alpha 1$ of the cells but is not larger than the coefficient of thermal expansion $\alpha 2$ of the holding means ($\alpha 1 \leq \alpha 4 \leq \alpha 2$). In a preferred embodiment, the fuel cell assembly comprises a plurality of cells, the holding means is constituted by a plate member that defines the upper surface of the gas casing, a plurality of through openings are formed in the plate member at intervals in the back-and-forth direction, the ends on one side of the cells are inserted in the through openings, and the fixing member and the sealing member are filled in a laminated manner between the outer peripheral surfaces of the ends on one side of the cells and the inner peripheral surfaces of the through openings. In another preferred embodiment, the fuel cell assembly comprises a plurality of cells, the holding means is constituted by a closure member having a rectangular upper wall, both end walls and both side walls hanging down from both end edges and both side edges of the upper wall and defining the upper part of the gas casing, the closure member has a plurality of through openings formed penetrating through the upper wall and extending through the upper portions of both side walls at intervals in the back-and-forth direction, the ends on one side of the cells are inserted in the through openings in such a manner that both ends of the ends on one side are brought into contact with the upper surfaces of the remaining lower portions of both side walls of the closure member, and the fixing member and the sealing member are filled in a laminated manner between both side surfaces of the ends on one side of the cells and the through openings. In a further preferred embodiment, the fuel cell assembly comprises a plurality of cells, the holding means is constituted by a rectangular frame member that defines the upper surface of the gas casing, the lower ends of the plurality of cells are arranged on a rectangular region surrounded by the rectangular frame member at intervals in the back-and-forth direction, and the fixing member and the sealing member are filled in a laminated manner in a remaining space in the rectangular region. It is desired that the gas casing includes a box-like body having a bottom wall, both end walls and both side walls erected from both end edges and both side edges of the bottom wall and having an open upper surface, upwardly faced shoulder surfaces are formed in the inner surfaces at the upper ends of both end walls and both side walls of the box-like body, and at least the outer side portions of the rectangular frame member are positioned on the shoulder surfaces. A bonding member may be filled between the shoulder surfaces of the box-like body, the inner surfaces of both end walls and both side walls positioned higher than the shoulder surfaces and the outer peripheral surface and lower surface of the rectangular frame member. It is desired that at least the outer side portions of the lower surface of the holding member are the tilted surfaces that are tilted upwards and outwards. The sealing member can be so constituted as to cover the upper surface of the fixing member as well as the upper surface of the rectangular frame member, upper surface of the bonding member, and upper surfaces of both end walls and both side walls of the box-like body.

DETAILED DESCRIPTION OF THE PREFERRED EMBODIMENTS

Preferred embodiments of the fuel cell assembly constituted according to the present invention will now be described in further detail with reference to the accompanying drawings.

Figure 1:
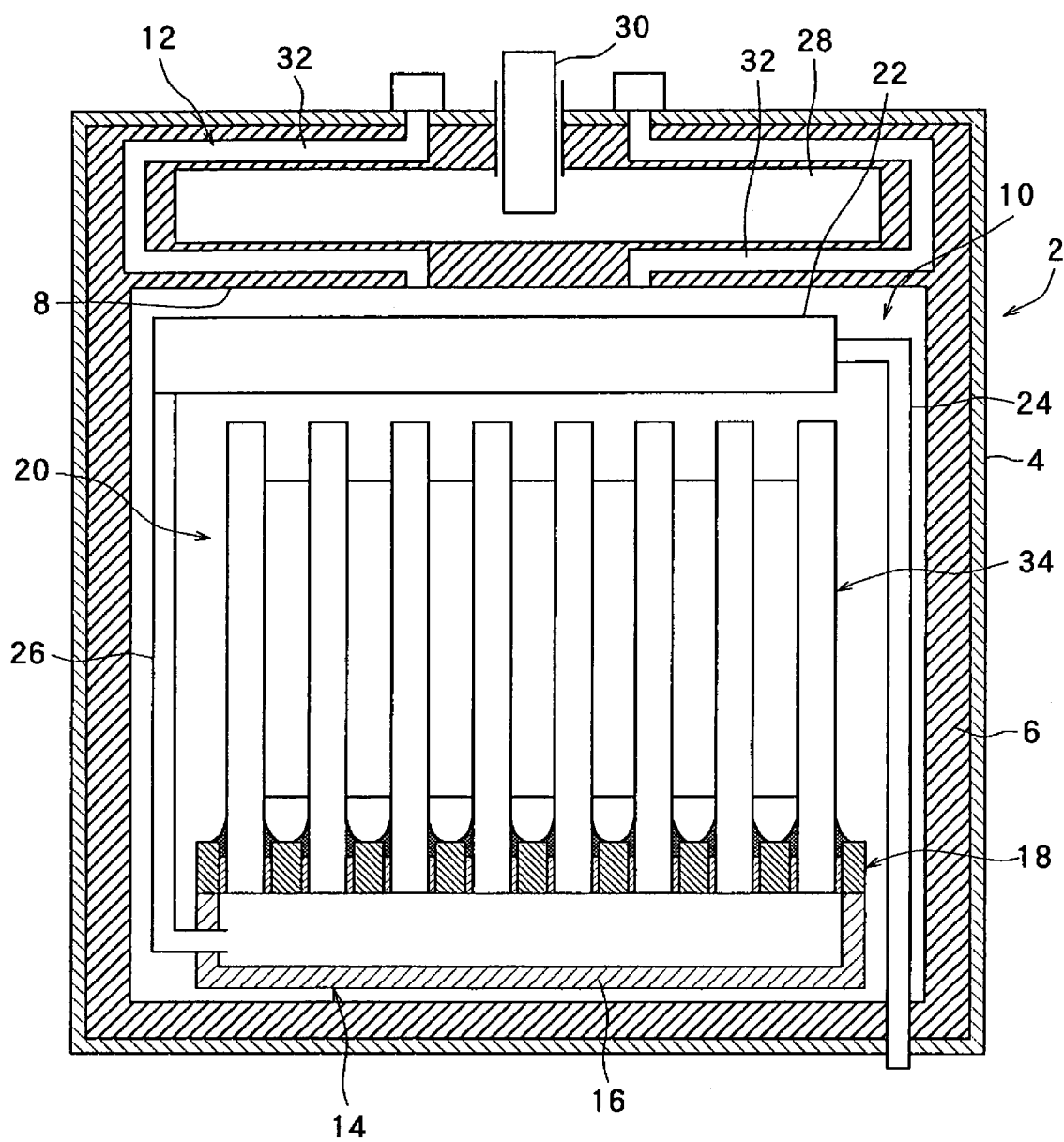
FIG. 1 is a longitudinal sectional view schematically illustrating a preferred embodiment of a fuel cell assembly constituted according to the present invention.

FIG. 1 is a view illustrating a preferred embodiment of a fuel cell assembly of the solid electrolyte type that is a typical example of the fuel cell assembly constituted according to the present invention. The illustrated assembly has a housing 2 of nearly a rectangular parallelopiped shape, which is constituted by an outer frame 4 made of a heat-resistant metal and a heat-insulating layer 6 lined on the inner surfaces thereof. A plate-like heat-insulation layer 8 is arranged on the upper part of the housing 2 to extend in a horizontal direction, and the interior of the housing 2 is partitioned into an electricity generation/combustion chamber 10 located below the heat-insulation layer 8 and an additional chamber 12 positioned above the heat-insulation layer 8.

Four gas casings 14 (one of which is illustrated in FIG. 1) are arranged at lower portion of the electricity generation/combustion chamber 10 at intervals in the direction of width (in a direction perpendicular to the surface of the paper in FIG. 1). Each gas casing 14 is of a rectangular parallelopiped shape slenderly extending in the back-and-forth direction (right-and-left direction in FIG. 1), and is constituted by a box-like body 16 of which the upper surface is opened and a plate member 18 that is arranged on the upper surface of the body 16 and defines the upper surface of the gas casing 14. In the illustrated embodiment, cell stacks generally designated at 20 are arranged on the plate members 18 of the gas casings 14. The cell stacks 20, and a relationship between the cell stacks 20 and the plate members 18 constituting the holding member, will be described later in further detail. In the illustrated embodiment, the four gas casings 14 are arranged in parallel in the back-and-forth direction, and the cell stacks 20 are arranged on the respective plate members 18 of the gas casings 14. As desired, however, there may be arranged a single gas casing having a corresponding size in the direction of width, and the cell stacks may be arranged in four columns in parallel on the plate member defining the upper surface of the gas casing.

On the upper part of the electricity generation/combustion chamber 10, there are arranged reforming casings 22, which correspond to the cell stacks 20. The reforming casings 22 can be made of a suitable heat-resistant metal. In each reforming casing 22, there is stored a suitable catalyst (not shown) for reforming a gas to be reformed, such as the city gas, into a fuel gas rich in hydrogen. To-be-reformed gas introduction pipes 24 are coupled to the ends on one side of the reforming casings 22 (right ends in FIG. 1) and fuel gas feed pipes 26 are connected to the other ends thereof (left ends in FIG. 1). The to-be-reformed gas introduction pipes 24 extend to the outer side of the housing 2 penetrating through the lower wall of the housing 2 and are connected to a source (not shown) for supplying the gas to be reformed, which may be the city gas. The fuel gas feed pipes 26 are connected to the gas casings 14. In this embodiment, the reforming casings 22 are arranged for the gas casings 14 and the cell stacks 20 arranged in four columns. As desired, a single common reforming casing may be arranged for the gas casings 14 and the cell stacks 20 arranged in four columns.

An air manifold chamber 28 is arranged in the additional chamber 12 divided in the upper part of the housing 2. An oxygen-containing gas introduction pipe 30 is connected to the air manifold chamber 28, the oxygen-containing gas introduction pipe 30 penetrating through the upper wall of the housing 2 and extending to the outer side of the housing 2. The oxygen-containing gas introduction pipe 30 is connected to a source (not shown) for supplying the oxygen-containing gas that may be the air. To the air manifold chamber 28 is further connected an oxygen-containing gas ejection means (not shown) hanging down among the cell stacks 20 from the lower surface thereof. The oxygen-containing gas ejection means can be constituted by ejection pipes having an ejection port or by a hollow ejection plate. In the additional chamber 12 are further arranged exhaust ducts 32 for communicating the electricity generation/combustion chamber 10 with the exterior of the housing 2.

Figure 2:
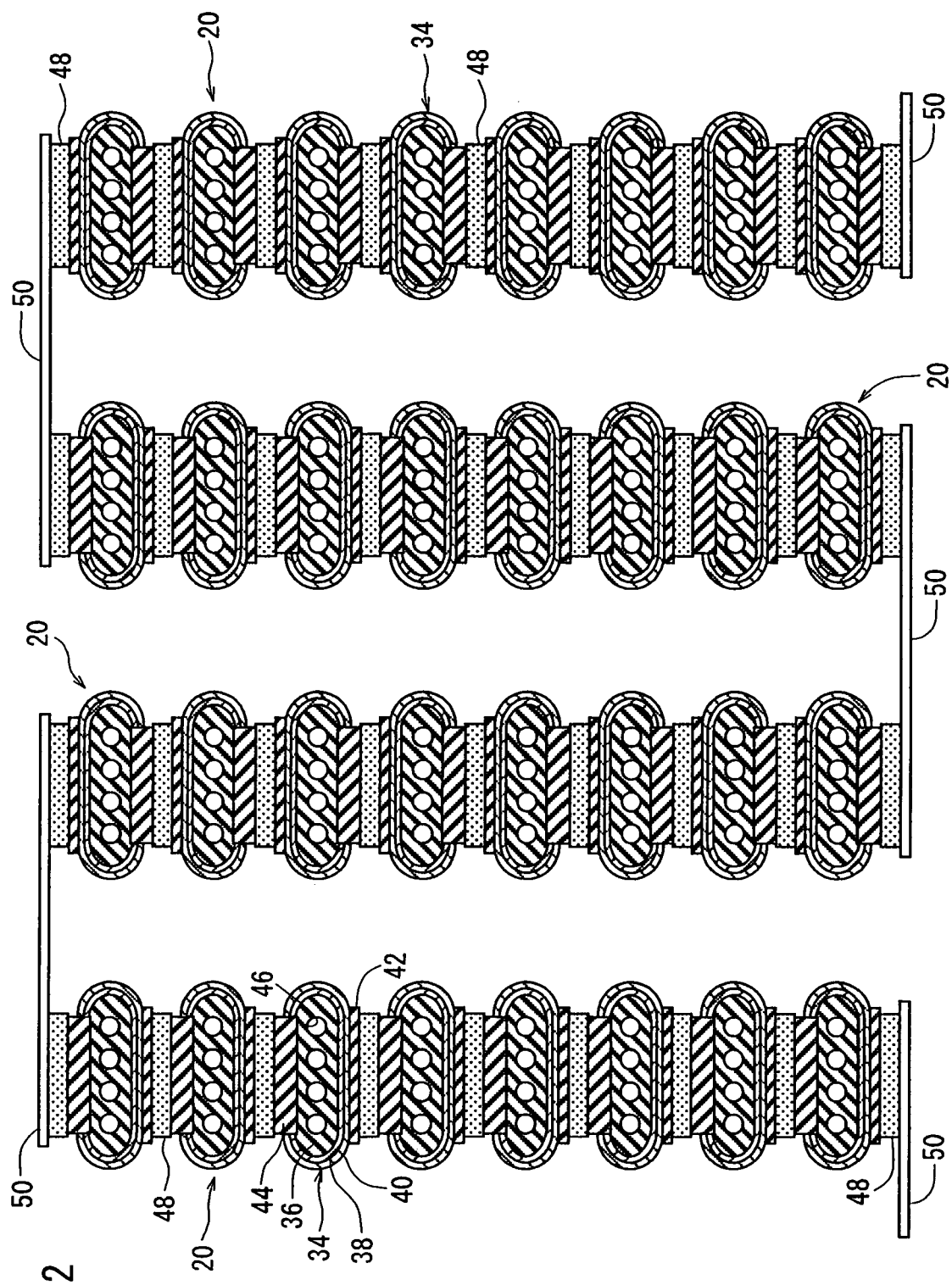
FIG. 2 is a transverse sectional view illustrating cell stacks in the fuel cell assembly of FIG. 1.

If the description is further continued with reference to FIGS. 1 and 2, each cell stack 20 is constituted by arranging the cells 34 in a plural number (eight cells in the illustrated embodiment) in the right-and-left direction in FIG. 1 or in the up-and-down direction in FIG. 2, the cells 34 slenderly extending in the vertical direction, i.e., in the up-and-down direction in FIG. 1 or in a direction perpendicular to the surface of the paper in FIG. 2. As clearly illustrated in FIG. 2, each cell 34 is constituted by an electrode support substrate 36, a fuel electrode layer 38 which is an inner electrode layer, a solid electrolyte layer 40, an oxygen electrode layer 42 which is an outer electrode layer, and an interconnector 44.

The electrode support substrate 36 is a plate-like piece slenderly extending in the vertical direction, and has both surfaces which are flat and both side surfaces which are of a semi-circular shape. A plurality of (four in the illustrated embodiment) gas passages 46 are formed in the electrode support substrate 36 penetrating through in the vertical direction.

The interconnector 44 is arranged on one surface of the electrode support substrate 36 (upper surface of the cell stack 20 located at the left end in FIG. 2). The fuel electrode layer 38 is arranged on the other surface of the electrode support substrate 36 (lower surfaces of the cell stack 20 located at the left end in FIG. 2) and on both side surfaces, and both ends thereof are connected to both ends of the interconnector 44. The solid electrolyte layer 40 is so arranged as to cover the entire fuel electrode layer 38, and both ends thereof are connected to both ends of the interconnector 44. The electrode layer 42 is arranged on the main portion of the solid electrolyte layer 40, i.e., on a portion covering the other surface of the electrode support substrate 36, and is positioned facing the interconnector 44 interposing the electrode support substrate 36 therebetween.

Current collector members 48 are arranged among the neighboring cells 34 of the cell stack 20 to connect the interconnector 44 of one cell 34 to the oxygen electrode layer 42 of the other cell 34. The collector members 48 are arranged at both ends of each cell stack 20, i.e., on one surface and on the other surface of the cells 34 positioned at the upper end and at the lower end in FIG. 2. A conducting member 50 connects together the collector members 48 arranged on two ends on one side (upper ends in FIG. 2) located on the left side in FIG. 2 out of the four columns of cell stacks 20, another conducting member 50 connects together the collector members 48 arranged on two ends on the other side (lower ends in FIG. 2) located at the center, and a further conductor member 50 connects together the collector members 48 arranged on two ends on one side (upper ends in FIG. 2) located on the right side. Further, a conductor member 50 is connected to the collector member 48 arranged on an end on the other side (lower end in FIG. 2) located at the left end out of the four columns of cell stacks 20, and a conductor member 50 is connected to the collector member 48 arranged on an end on the other side (lower end in FIG. 2) at the right end. Thus, all cells 34 are electrically connected in series.

The cells 34 will be described in further detail. The electrode support substrate 36 must be gas-permeable permitting the fuel gas to permeate to the fuel electrode layer 38 and must, further, be electrically conducting to collect electricity through the interconnector 44. To satisfy these requirements, the electrode support substrate 36 is made of a porous electrically conducting ceramic or cement. To form the electrode support substrate 36 by the simultaneous firing with the fuel electrode layer 38 and/or the solid electrolyte layer 40, it is desired that the electrode support substrate 36 is made of a metal component of the iron group and an oxide of a particular rare earth element. To impart a required gas permeability, it is desired that the electrode support substrate 36 has an open porosity of not smaller than 30% and, particularly, in a range of 35 to 50%, and an electric conductivity of not smaller than 300 S/cm and, particularly, not smaller than 440 C/cm. The fuel electrode layer 38 can be made of a porous electrically conducting ceramic, such as $ZrO_2$ (called stabilized zirconia) that is formed from a rare earth element in a form of a solid solution and nickel and/or NiO. The solid electrolyte layer 40 needs to have a function as an electrolyte for building bridges of electrons between the electrodes and also to have a gas barrier property for preventing the leakage of the fuel gas and the oxygen-containing gas, and is, usually, formed from $ZrO_2$ containing 3 to 15 mol % of a rare earth element in a solid solution. The oxygen electrode layer 42 can be made of an electrically conducting ceramic comprising a perovskite oxide of the so-called $ABO_3$ type. The oxygen electrode layer 42 must be gas-permeable and, desirably, has an open porosity of not smaller than 20% and, particularly, in a range of 30 to 50%. The interconnector 44 can be formed from an electrically conducting ceramic and is further required to have reduction resistance and oxidation resistance, since it comes in contact with the fuel gas which may be a hydrogen gas and with the oxygen-containing gas which may be the air. For this purpose, a lanthanum chromite-based perovskite-type oxide ($LaCrO_3$-based oxide) is used preferably. The interconnector 44 must be dense enough to prevent the leakage of fuel gas passing through the fuel passages 46 formed in the electrode support substrate 36 and the leakage of oxygen-containing gas flowing on the outer side of the electrode support substrate 36. It is, therefore, desired that the interconnector 44 has a relative density of not smaller than 93% and, particularly, not smaller than 95%. The collector member 48 may be constituted by a member of any suitable shape formed from a metal or alloy having resiliency or may be constituted by a member obtained by subjecting a felt comprising a metal fiber or alloy fiber to a required surface treatment. The electrically conducting member 50 can be formed from a suitable metal or alloy.

Figure 3:
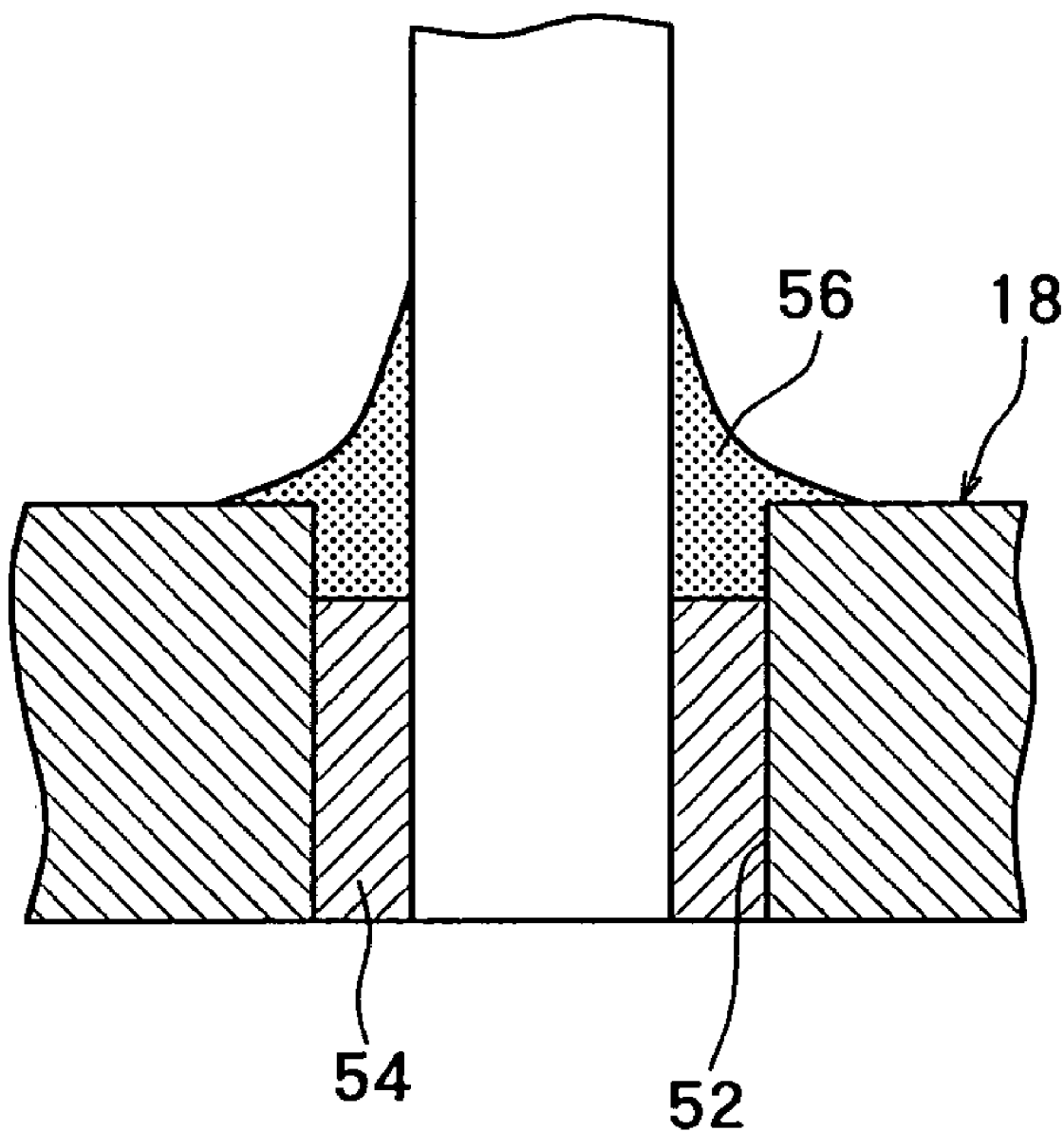
FIG. 3 is a sectional view illustrating, partly on an enlarged scale, a mode for gas-tightly fixing the cells to a plate member that constitutes a holding means in the fuel cell assembly of FIG. 1.

If further described with reference to FIG. 1 together with FIG. 3, the plate members 18 constituting the holding means are arranged on the upper surface of each gas casing 14 arranged on the lower part of the electricity generation/combustion chamber 10. The plate members 18 that can be made of a suitable heat-resistant metal or alloy can be fixed to the box-like body 16 of the gas casings 14 via an appropriate fixing and sealing member. If required, between the plate members 18 and the box-like body 16, there can be arranged a fixing member and a sealing member having properties different from each other, as will be described below in detail, in a laminated manner, instead of using the single fixing and sealing member. The plate member 18 has a plurality (eight in the drawing) of through openings 52 formed at intervals in a direction in which the cells 34 are arranged in the cell stack 20, i.e., in the right-and-left direction in FIG. 1, and the ends on one side, i.e., the lower ends of the cells 34 are inserted in the through openings 52. In the fuel cell assembly constituted according to the present invention, it is important that a fixing member 54 and a sealing member 56 having properties different from each other are arranged between the respective cells 34 and the plate members 18 constituting the holding member for the cells 34. In the illustrated embodiment, the fixing member 54 is arranged between the inner wall of the through opening 52 formed in the plate member 18 and the periphery of the lower end of the cell 34, and the sealing member 56 is laminated on the side of the upper surface of the fixing member 54. Therefore, the fixing member 54 is covered with the sealing member 56 and is avoided from being exposed to the electricity generation/combustion chamber 10. The sealing member 56 exists between the upper part on the inner peripheral surface of the through opening 52 and the periphery of the lower end of the cell 34 and, further, overflows above the through opening 52 of the plate member 18 to exist between the upper surface of the plate member 18 and the periphery of the cell 34, as shown in FIG. 3. As desired, the entire upper surface of the plate member 18 may be covered with the sealing member 56.

The fixing member 54 is for firmly fixing the cells 34 to the plate member 18 and, desirably, has a softening temperature of higher than 1000° C. It is desired that the fixing member 54 that preferably has electrically insulating properties is a ceramic, glass or cement or, particularly, a crystalline ceramic having a high degree of crystallinity and containing $SiO_2$, $ZnO$, $B_2O_3$ and $RO$ (R is an alkali earth metal). It is desired that the fixing member 54 has a coefficient of thermal expansion $\alpha 3$ which is not smaller than 50% of the coefficient of thermal expansion $\alpha 1$ of the cell 34 but is not larger than 150% of the coefficient of thermal expansion $\alpha 2$ of the plate member 18 ($0.5\,\alpha 1 \leq \alpha 3 \leq 1.5\,\alpha 2$).

The sealing member 56, on the other hand, is for accomplishing a gas-tight sealing between the plate member 18 and the lower end of the cell 34 and, desirably, has a softening temperature of 700 to 1000° C. Preferred examples of the sealing member 56 that preferably has electrically insulating properties include a glass and a crystalline or amorphous ceramic having a low degree of crystallinity and containing $SiO_2$, $ZnO$, $B_2O_3$ and $RO$ (R is an alkali earth metal). According to experiment by the present inventors, it is further desired that the coefficient of thermal expansion $\alpha 4$ of the sealing member 56 is not smaller than the coefficient of thermal expansion $\alpha 1$ of the cell 34 but is not larger than the coefficient of thermal expansion $\alpha 2$ of the plate member 18 ($\alpha 1 \leq \alpha 4 \leq \alpha 2$) to fully reliably avoid the development of cracks due to a relatively large tensile stress in the sealing member 56 and to avoid deterioration in the gas-tight sealing of the sealing member 56. The coefficient of thermal expansion $\alpha 1$ of the cell 34 is, usually, nearly equal to the coefficient of thermal expansion of the material constituting the electrode support substrate 36 from the fact that most of the volume of the cell 34 is occupied by the electrode support substrate 36.

In the structure for fixing and sealing the cells illustrated in FIGS. 1 and 3, for instance, a glass paste was prepared by adding and mixing 9% of a solvent and 2% of a dispersant into a glass powder having a coefficient of thermal expansion $\alpha 4$ of $11.8 \times 10^{-6}/°$ C. and an average particle size of 9 μm. The glass paste was applied onto between the plate members 18 and the cells 34, the solvent was dried at 130° C. and, then, the glass was melted by heating at 950° C. and was cooled down to a normal temperature. Thereby, a gas-tight sealing was accomplished between the plate members 18 and the cells 34 without developing cracks in the glass that constitutes the sealing member. The coefficient of thermal expansion $\alpha 1$ of the cells 34 was $11.6 \times 10^{-6}$. There were used two types of the plate members 18, i.e., the ones made of SUS 430 having a coefficient of thermal expansion $\alpha 2$ of $12.1 \times 10^{-6}$ and the ones made of forsterite having a coefficient of thermal expansion $\alpha 2$ of $12.0 \times 10^{-6}$.

When there was used a glass powder having a coefficient of thermal expansion $\alpha 4$ of $10.2 \times 10^{-6}$ which was smaller than the coefficient of thermal expansion $\alpha 1$ of the cell 34, on the other hand, cracks developed in the glass after it was cooled down from its molten state. Cracks developed in the glass after it was cooled down from its molten state when there was used the plate member 18 made of zirconia having a coefficient of thermal expansion $\alpha 2$ of $11.0 \times 10^{-6}$ and when there was used the sealing member 56 made of a glass powder having a coefficient of thermal expansion $\alpha 4$ of $11.8 \times 10^{-6}$ which was larger than the coefficient of thermal expansion $\alpha 2$ of the plate member 18.

In the illustrated embodiment, the plate member 18 defining the upper surface of the gas casing 14 is used as a holding member for gas-tightly fixing the cells 34. In its place, however, it is also allowable to use a plate member or a member of any other suitable shape arranged on the upper surface of the above plate member defining the upper surface of the gas casing 14, as a holding member for gas-tightly fixing the cells 34.

In the cell assembly as described above, a to-be-reformed gas which may be the city gas is fed to the reforming casings 22 through the to-be-reformed gas introduction pipes 24, and is reformed into a fuel gas rich in hydrogen in the reforming casings 22 and is, then, fed into the gas casings 14 through the fuel gas feed pipes 26. Thereafter, the fuel gas is introduced into the lower ends of the gas passages 46 formed in the electrode support substrates 36 in the cells 34, and rises through the gas passages 46. On the other hand, the oxygen-containing gas that may be the air is introduced into the air manifold chamber 28 through the oxygen-containing gas introduction pipes 30, and is ejected into the electricity generation/combustion chamber 10 through oxygen-containing gas ejection means (not shown). Thus, the fuel gas and the oxygen-containing gas are fed into the respective cells 34. In the cells 34, an electrode reaction expressed by the following formula (1) takes place on the oxygen electrode layer 42 while an electrode reaction expressed by the following formula (2) takes place on the fuel electrode layer 38 to generate electricity.

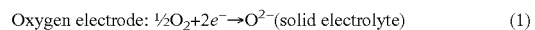

Oxygen electrode: ½O₂+2e⁻→O²⁻(solid electrolyte)     (1)

Fuel electrode: O²⁻(solid electrolyte)+H₂→H₂O+2e⁻     (2)

The fuel gas that flew through the gas passages 46 in the electrode support substrate 36 in the cells but that was not used for the electrode reaction, flows into the electricity generation/combustion chamber 10 from the upper ends of the electrode support substrates 36. The fuel gas burns as it flows into the electricity generation/combustion chamber 10. A suitable igniting means (not shown) is arranged in the electricity generation/combustion chamber 10 and starts operating as the fuel gas starts flowing into the electricity generation/combustion chamber 10 to start the combustion. Oxygen in the oxygen-containing gas that was ejected into the electricity generation/combustion chamber 10 but was not used for the electrode reaction, is utilized for the combustion. The interior in the electricity generation/combustion chamber 10 acquires a temperature as high as, for example, about 700 to about 1000° C. due to the generation of electricity in the cells 34 and due to the combustion of the combustion gas. The combustion gas formed by the combustion in the electricity generation/combustion chamber 10 is discharged to the outside of the housing 2 from the upper end of the electricity generation/combustion chamber 10 through exhaust ducts 32.

Even when the interior in the electricity generation/combustion chamber 10 acquires a temperature as high as about 700 to about 1000° C., the fixing member 54 fixing the cells 34 to the plate members 18 is not softened, and the cells 34 are maintained fixed to the plate members 18 sufficiently firmly. Further, even in case the sealing member 56 is softened at a temperature of about 700 to about 1000° C., the sealing member 56 is prevented from undesirable flowing by the fixing member 54 that is maintained without being softened.

Figure 4:
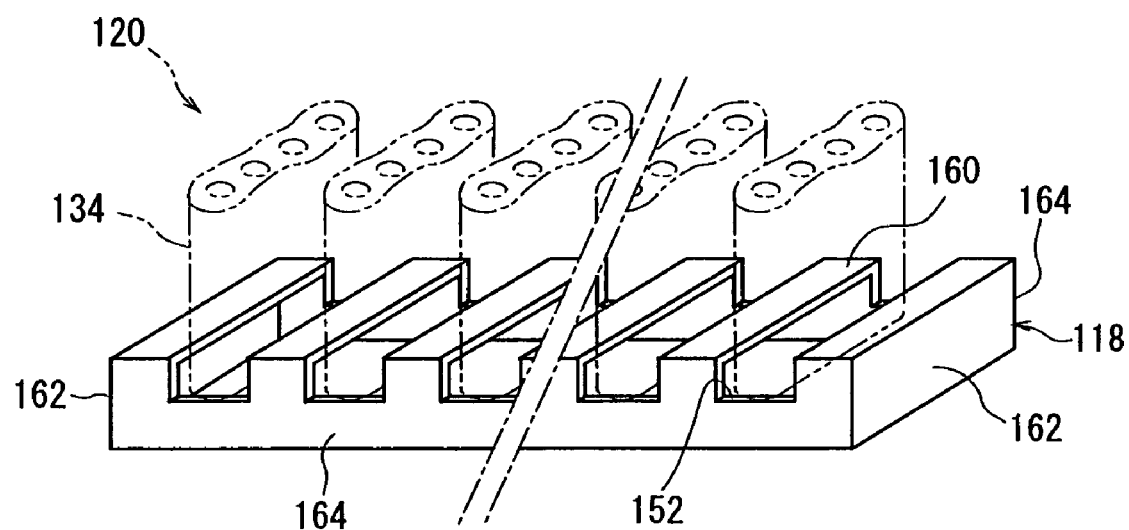
FIG. 4 is a partial perspective view illustrating a modified embodiment of the mode for gas-tightly fixing the cells to the holding means.
Figure 5:
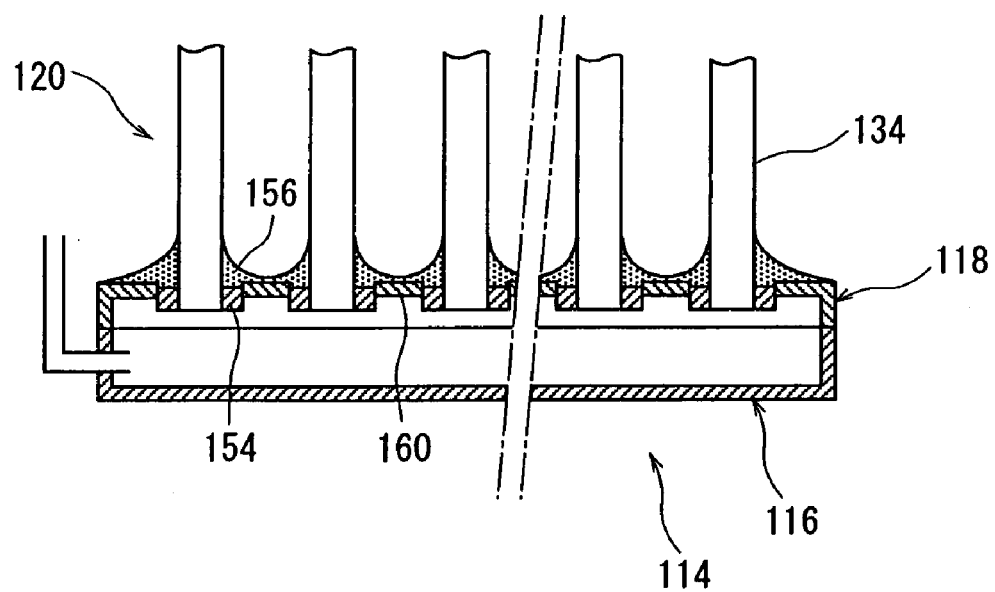
FIG. 5 is a partial sectional view illustrating the modified embodiment of the mode for gas-tightly fixing the cells to the holding means.

FIGS. 4 and 5 illustrate a modified embodiment of a mode in which the cells are gas-tightly fixed to the holding means. In the embodiment illustrated in FIGS. 4 and 5, a gas casing 114 is constituted by a box-like body 116 and a closure member 118 that constitutes the holding means. The closure member 118 has rectangular upper walls 160, both end walls 162 and both side walls 164 hanging down from both end edges and both side edges of the upper walls 160. The lower surfaces of both end walls 162 and both side walls 164 of the closure member 118 are fixed to the upper surfaces of both end walls and both side walls of the box-like body 116 via a suitable fixing and sealing member. A plurality of through openings 152 are formed in the closure member 118 at intervals in a direction in which the cells 134 of the cell stacks 120 are arranged, i.e., in the back-and-forth direction. The through openings 152 are extending penetrating through the upper wall 160 and through the upper half portions of both side walls 164. The lower ends of the cells 134 are inserted in the through openings 152, and both ends at the lower ends of the cells 134 are brought into contact with the upper surfaces of the remaining lower portions of both sidewalls 164. A fixing member 154 and a sealing member 156 are arranged in a laminated manner between the lower ends of the cells 134 and the closure member 118. If described in further detail, the fixing member 154 is filled in the through openings 152 in which the lower ends of the cells 134 are inserted, and the sealing member 156 is further filled therein so as to cover the upper surface of the fixing member 154. In the illustrated embodiment, the sealing member 156 covers not only the upper surface of the fixing member 154 but also substantially the entire upper surface of the closure member 118. The fixing member 154 and the sealing member 156 may be the same as the fixing member 54 and the sealing member 56 (FIG. 3) described above.

Figure 6:
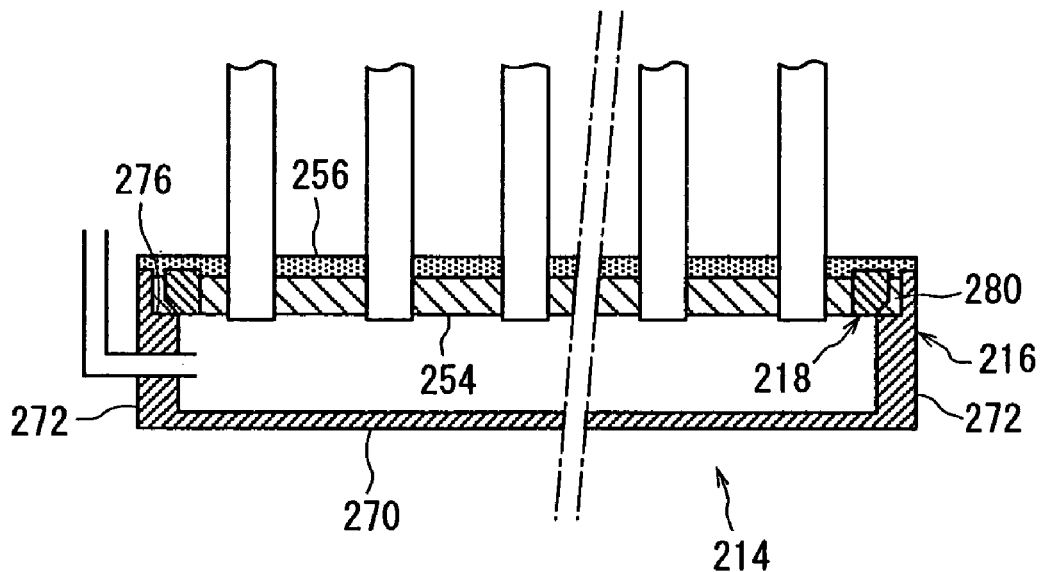
FIG. 6 is a partial perspective view illustrating another modified embodiment of the mode for gas-tightly fixing the cells to the holding means.
Figure 7:
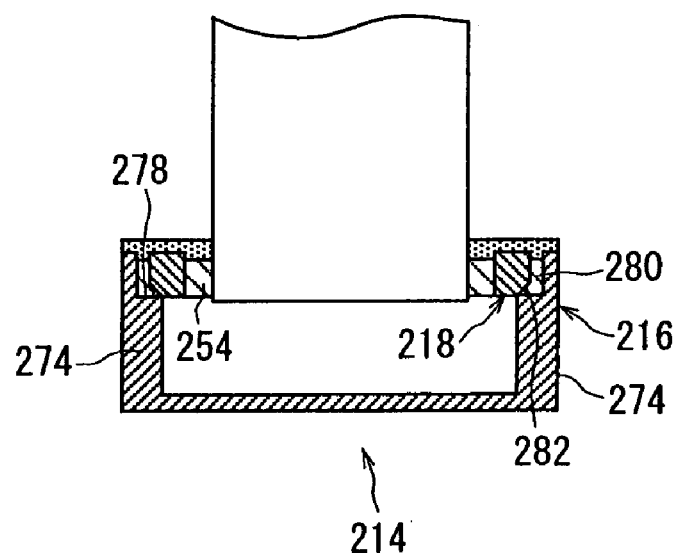
FIG. 7 is a partial sectional view illustrating another modified embodiment of the mode for gas-tightly fixing the cells to the holding means.

FIGS. 6 and 7 illustrate another modified embodiment of a mode in which the cells are gas-tightly fixed to the holding means. In the embodiment illustrated in FIGS. 6 and 7, a gas casing 214 is constituted by a box-like body 216 and a rectangular frame member 218 that constitutes the holding means. The box-like body 216 has a bottom wall 270 as well as both end walls 272 and both side walls 274 erected from both end edges and both side edges of the bottom wall 270, and has its upper surface opened. Both end walls 272 and both side walls 274 have a decreased wall thickness at the upper ends thereof, and shoulder surfaces 276 and 278 are formed facing upward in the inner surfaces at the upper ends of both end walls 272 and both side walls 274. The rectangular frame member 218 has a rectangular outer shape which is slightly smaller than a rectangular shape defined by the inner surfaces at the upper ends of both end walls 272 and both side walls 274 of the box-like body 216; and its outer side portions are placed on the shoulder surfaces 276 and 278 of the box-like body 216. A bonding member 280 is filled between the outer peripheral surfaces of the rectangular frame member 218 and the portions upper than the shoulder surfaces 276, 278 of both end walls 272 and both side walls 274 of the box-like body 216. Further, the outer side portions of the lower surfaces of the rectangular frame member 218 are upwardly tilted outwards to form tilted surfaces 282. The bonding member 280 is filled between the tilted surfaces 282 and the shoulder surfaces 276, 278 of the box-like body 216, too. Thus, the rectangular frame member 218 is fixed onto the shoulder surfaces 276 and 278 of the box-like body 216. The bonding member 280 may be the same as the fixing member 54 (FIG. 3) described above.

Described below is how to fix the cells 234 to the rectangular frame member 218 that constitutes the holding means. Prior to fixing the rectangular frame member 218 to the box-like body 216, the lower ends of the cells 234 are arranged in a rectangular region defined by the rectangular frame member 218 at intervals in the back-and-forth direction (right-and-left direction in FIG. 6). Then, a fixing member 254 in a pasty or slurry state is filled in the remaining space of the rectangular region and is solidified, thereby fixing the lower ends of the cells 234 to the rectangular frame member 218. Next, the rectangular frame member 218 is fixed onto the shoulder surfaces 276 and 278 of the box-like body 216 and, then, the sealing member 256 is filled in a laminated manner on the fixing member 254. It is desired that the sealing member 256 covers not only the fixing member 254 but also the upper surface of the rectangular frame member 218 as well as the upper surfaces of both end walls 272, 274 of the box-like body 216. Particularly, the rectangular frame member 218 is formed from a metal or alloy, it is desired that the rectangular frame member 218 is covered with the sealing member 256 so as to be avoided from being exposed to the electricity generation/combustion chamber that has an oxidative atmosphere. The fixing member 254 and the sealing member 256 may be the same as the fixing member 54 and the sealing member 56 (FIG. 3) described above.

In the embodiment illustrated in FIGS. 6 and 7, the rectangular frame member 218 is fixed onto the shoulder surfaces 276 and 278 of the box-like body 216. As desired, the rectangular frame member 218 may be fixed onto the shoulder surfaces 276 and 278 of the box-like body 216 by filling the sealing member 256 also between the rectangular frame member 218 and the box-like body 216 at the time when the sealing member 256 is filled in a laminated manner on the fixing member 254, in place of the bonding member 280.

The preferred embodiments of the fuel cell assembly constituted in accordance with the present invention have been described in detail with reference to the accompanying drawings. However, it should be understood that the present invention is not limited to these preferred embodiments, and various modifications and corrections may be made without departing from the scope of the present invention.

Foe example, in the embodiment illustrated in FIG. 1, a fuel gas rich in hydrogen is fed into the gas casing 14 and an oxygen-containing gas is fed to the electricity generation/combustion chamber 10. The present invention, however, can be applied to a fuel cell assembly of the type in which an oxygen-containing gas is fed into the gas casing 14 and a fuel gas is fed to the electricity generation/combustion chamber. Further, in the embodiment illustrated in FIG. 1, the fuel gas and oxygen-containing gas, which were not used for generation of electricity were combusted in the electricity generation/combustion chamber 10, but as desired, the fuel gas and oxygen-containing gas, which were not used for generation of electricity may be suitably recovered without bursting them (in other words, the electricity generation/combustion chamber 10 does not function as a combustion chamber but works only as an electricity generation chamber.)

What we claim is:

1. A fuel cell assembly comprising:
cells having gas passages,
a holding means,
a fixing member for fixing the cells to the holding means, the fixing member being arranged between the peripheries of the ends on one side of said cells and the holding means, a sealing member being arranged between the peripheries of the cells and the holding means so as to cover the fixing member, the softening temperature of the fixing member being higher than 1000° C., and the softening temperature of the sealing member being from 700 to 1000° C., wherein the fixing member and sealing member have different compositions; wherein said sealing member is a crystalline or amorphous ceramic having a low degree of crystallinity and containing $SiO_2$, ZnO, $B_2O_3$, and RO (R is an alkali earth metal) and the fixing member is a crystalline or amorphous ceramic having a higher degree of crystallinity and containing $SiO_2$, ZnO, $B_2O_3$, and RO (R is an alkali earth metal).

2. The fuel cell assembly according to claim 1, wherein portions higher than said ends on one side of said cells are exposed in an electricity generation chamber, and said sealing member is arranged by said fixing member on the side of the electricity generation chamber, so that said fixing member is covered with said sealing member so as to be avoided from being exposed to said electricity generation chamber.

3. The fuel cell assembly according to claim 1, wherein a coefficient of thermal expansion $\alpha 1$ of said cells is smaller than a coefficient of thermal expansion $\alpha 2$ of said holding means, and a coefficient of thermal expansion $\alpha 3$ of said fixing member is not smaller than 50% of the coefficient of thermal expansion $\alpha 1$ of said cells but is not larger than 150% of the coefficient of thermal expansion $\alpha 2$ of said holding means (0.5 $\alpha 1 < \alpha 3 < 1.5\ \alpha 2$).

4. The fuel cell assembly according to claim 1, wherein a coefficient of thermal expansion $\alpha 4$ of said sealing member is not smaller than the coefficient of thermal expansion $\alpha 1$ of said cells but is not larger than the coefficient of thermal expansion $\alpha 2$ of said holding means ($\alpha 1 \leq \alpha 4 \leq \alpha 2$).

5. The fuel cell assembly according to claim 1, wherein said fuel cell assembly comprises a plurality of cells, said holding means is constituted by a plate member that defines the upper surface of a gas casing, a plurality of through openings are formed in said plate member at intervals in the back-and-forth direction, said ends on one side of said cells are inserted in said through openings, and said fixing member and said sealing member are filled in a laminated manner between the outer peripheral surfaces of said ends on one side of said cells and the inner peripheral surfaces of said through openings.

6. The fuel cell assembly according to claim 1, wherein said fuel cell assembly comprises a plurality of cells, said holding means is constituted by a closure member having a rectangular upper wall, both end walls and both side walls hanging down from both end edges and both side edges of said upper wall and defining the upper part of a gas casing, said closure member has a plurality of through openings formed penetrating through said upper wall and extending through the upper portions of said both side walls at intervals in the back-and-forth direction, said ends on one side of said cells are inserted in said through openings in a manner that both ends of said ends on one side are brought into contact with the upper surfaces of the remaining lower portions of said both side walls of said closure member, and said fixing member and said sealing member are filled in a laminated manner between said ends on one side of said cells and said closure member.

7. The fuel cell assembly according to claim 1, wherein said fuel cell assembly comprises a plurality of cells, said holding means is constituted by a rectangular frame member that defines the upper surface of a gas casing, said lower ends of the plurality of cells are arranged in a rectangular region surrounded by said rectangular frame member at intervals in the back-and-forth direction, and said fixing member and said sealing member are filled in a laminated manner in a remaining space in said rectangular region.

8. The fuel cell assembly according to claim 7, wherein said gas casing comprises a box-like body having a bottom wall, both end walls and both side walls erected from both end edges and both side edges of said bottom wall and having an open upper surface, upwardly faced shoulder surfaces are formed in the inner surfaces at the upper ends of said both end walls and said both side walls of said box-like body, and at least the outer side portions of said rectangular frame member are positioned on said shoulder surfaces.

9. The fuel cell assembly according to claim 8, wherein a bonding member is filled between said shoulder surfaces of said box-like body, the inner surfaces of said both end walls and said both side walls positioned higher than said shoulder surfaces and the outer peripheral surface and lower surface of said rectangular frame member.

10. The fuel cell assembly according to claim 9, wherein at least the outer side portions of said lower surfaces of said rectangular frame member are the tilted surfaces that are tilted upwards and outwards.

11. The fuel cell assembly according to claim 8, wherein said sealing member covers the upper surface of said fixing member as well as the upper surface of said rectangular frame member, upper surface of said bonding member, and upper surfaces of said both end walls and said both side walls of said box-like body.

12. The fuel cell assembly to claim 1, wherein the fixing member is not exposed to an electricity generation/combustion chamber by the sealing member.

13. The fuel cell assembly according to claim 1, wherein said fixing member is a ceramic, a glass or a cement.

14. The fuel cell assembly according to claim 1, wherein said sealing member is a glass.

* * * * *